(12) United States Patent
Chi et al.

(10) Patent No.: US 8,103,817 B2
(45) Date of Patent: Jan. 24, 2012

(54) SYSTEMS FOR ACCESSING MEMORY CARD AND METHODS FOR ACCESSING MEMORY CARD BY A CONTROL UNIT

(75) Inventors: Ming-Hsun Chi, Hsinchu (TW); Cheng Liang Chang, Yingge Township, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 13/007,783

(22) Filed: Jan. 17, 2011

(65) Prior Publication Data

US 2011/0113212 A1 May 12, 2011

Related U.S. Application Data

(62) Division of application No. 12/276,935, filed on Nov. 24, 2008, now Pat. No. 7,899,967.

(51) Int. Cl.
*H05K 7/10* (2006.01)
(52) U.S. Cl. ........................................ 710/301
(58) Field of Classification Search ................ 710/300, 710/301, 302, 105, 107, 108, 305, 200, 16, 710/17; 711/152, 154; 713/300, 310; 365/226, 365/227
See application file for complete search history.

(56) References Cited

U.S. PATENT DOCUMENTS

| | | | |
|---|---|---|---|
| 5,329,491 A | 7/1994 | Brown et al. |
| 5,428,579 A | 6/1995 | Robinson et al. |
| 5,636,347 A | 6/1997 | Muchnick et al. |
| 5,802,328 A | 9/1998 | Yoshimura |
| 5,877,975 A | 3/1999 | Jigour et al. |
| 6,175,517 B1 | 1/2001 | Jigour et al. |
| 6,638,087 B1 | 10/2003 | Takada et al. |
| 6,857,038 B2 | 2/2005 | Liu et al. |
| 6,896,532 B2 | 5/2005 | Chang |
| 6,957,983 B1 | 10/2005 | Lai |
| 6,984,152 B2 | 1/2006 | Mowery et al. |
| 7,009,846 B1 | 3/2006 | Wang et al. |
| 7,054,991 B2 | 5/2006 | Tanaka et al. |
| 2001/0027032 A1 | 10/2001 | Inomata et al. |
| 2005/0009406 A1 | 1/2005 | Chang |
| 2005/0036397 A1 | 2/2005 | Yeh et al. |
| 2005/0120253 A1 | 6/2005 | Morrow et al. |
| 2005/0281010 A1 | 12/2005 | Wang et al. |
| 2007/0177429 A1* | 8/2007 | Nagashima et al. ..... 365/185.22 |
| 2008/0057744 A1 | 3/2008 | Moritake |
| 2009/0013134 A1 | 1/2009 | Chen et al. |
| 2010/0265785 A1* | 10/2010 | Lee et al. ...................... 365/229 |

OTHER PUBLICATIONS

Secure Digital Input/Output (SDIO) Card Specification, version 1.00, Oct. 2001.
Using SDCard and SDIO with the Intel PXA250 Applications Processor MMC Controller, Feb. 2002.

* cited by examiner

*Primary Examiner* — Khanh Dang
(74) *Attorney, Agent, or Firm* — Thomas|Kayden

(57) ABSTRACT

A system for accessing a memory card is provided. The system includes a control unit having a control pin and a processor. The processor senses a card-insertion signal from a socket via the control pin for indicating whether the memory card has been inserted into the socket. The processor provides a power control signal via the control pin to supply an operating voltage to the memory card when the sensed card-insertion signal indicates that the memory card has been inserted into the socket. The processor detects whether a write protection function of the memory card is present via the control pin.

15 Claims, 13 Drawing Sheets

| | |
|---|---|
| Data0 | |
| Data1 | |
| Data2 | |
| Data3 | SD/MS/MSP/MMC shared pin |
| Command | |
| Clock | |
| Card Detect | |
| SD_WP | SD dedicated |
| Power | Operating Voltage |

FIG. 1

SYSTEMS FOR ACCESSING MEMORY CARD AND METHODS FOR ACCESSING MEMORY CARD BY A CONTROL UNIT

CROSS REFERENCE TO RELATED APPLICATIONS

This application is a Divisional of application Ser. No. 12/276,935, filed Nov. 24, 2008, the entirety of which is incorporated by reference herein.

BACKGROUND OF THE INVENTION

1. Field of the Invention

The invention relates to a method for accessing a memory card, and more particularly to a method for accessing a memory card by a control unit using less pins.

2. Description of the Related Art

A Secure Digital (SD) card is a non-volatile flash memory card format developed by Matsushita, SanDisk, and Toshiba for use in portable devices. A Memory Stick (MS) card is a removable flash memory card, launched by Sony, and is also used in general to describe the whole family of Memory Sticks. In addition to the original Memory Stick, the family of Memory Sticks also includes the Memory Stick PRO (MSP), a revision that allows greater maximum storage capacity and faster file transfer speeds. A MultiMediaCard (MMC) card is a flash memory card unveiled by Siemens AG and SanDisk.

Typically, the SD, MS, MSP or MMC memory card is used as a storage media and is widely used in digital cameras, handheld computers, PDAs, mobile phones, GPS receivers, TVs, DVD players, video game consoles and so on. When compared with the MS, MSP, or MMC memory cards, unlike the MS, MSP, or MMC memory cards, the SD card may have a write protection feature/function, wherein the SD card would be write-protected and in a read-only state when its write protection feature/function is enabled.

At present, electronic devices may provide a multi-in-one socket to support different types of memory cards (such as the SD, MS, MSP or MMC memory cards) for convenience, thus the complexity of control designs and hardware costs are increased.

BRIEF SUMMARY OF THE INVENTION

Systems for accessing a memory card and methods for accessing a memory card by a control unit are provided. An exemplary embodiment of a system for accessing a memory card comprises a control unit. The control unit comprises a control pin and a processor. The processor senses a card-insertion signal from a socket via the control pin for indicating whether the memory card has been inserted into the socket. The processor provides a power control signal via the control pin to supply an operating voltage to the memory card when the sensed card-insertion signal indicates that the memory card has been inserted into the socket. The processor detects whether a write protection function of the memory card is present via the control pin.

Furthermore, another exemplary embodiment of a system for accessing a memory card is provided, comprising a control unit. The control unit comprises a first control pin, a second control pin and a processor. The processor configures one of the first control pin and the second control pin to sense a card-insertion signal from a socket for indicating whether the memory card has been inserted into the socket. The processor configures one of the first control pin and the second control pin to provide a power control signal to supply an operating voltage to the memory card when the sensed card-insertion signal indicates that the memory card has been inserted into the socket. The processor configures one of the first control pin and the second control pin to detect whether a write protection function of the memory card is present.

Moreover, an exemplary embodiment of a method for accessing a memory card by a control unit with a control pin is provided. A card-insertion signal is sensed via the control pin, wherein the card-insertion signal indicates that the memory card has been inserted into a socket coupled to the control unit. A power control signal is provided to a power unit via the control pin, wherein the power unit provides an operating voltage to the inserted memory card. Next, it has been detected whether a write protection function of the inserted memory card is present via the control pin.

Moreover, another exemplary embodiment of a method for accessing a memory card by a control unit with a first control pin and a second control pin is provided. A card-insertion signal is sensed via one of the first control pin and the second control pin, wherein the card-insertion signal indicates that the memory card has been inserted into a socket coupled to the control unit. A power control signal is provided to a power unit via one of the first control pin and the second control pin, wherein the power unit provides an operating voltage to the inserted memory card. Next, it has been detected whether a write protection function of the inserted memory card is present via one of the first control pin and the second control pin.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 1 shows a pin table illustrating a pin list of a multi-in-one memory card socket;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIG. 1 shows a pin table illustrating a pin list of a multi-in-one memory card socket, wherein a Secure Digital (SD), Memory Stick (MS), Memory Stick Pro (MSP) or MultiMediaCard (MMC) memory card may be inserted into the multi-in-one memory card socket. The Data0, Data1, Data2 and Data3 pins are used to transfer a 4-bit data to/from the inserted memory card. A Command pin is used to transfer a command signal to/from the inserted memory card. A Clock pin is used to transfer a clock signal to the inserted memory card. A Card Detect pin is used to indicate whether a memory card has been inserted into the multi-in-one memory card socket. An SD_WP pin is a dedicated pin for an SD memory card and is used to indicate whether a write protection function of the SD card is present, i.e. whether the write protection function is enabled. A Power pin is used to provide an operating voltage to the inserted memory card.

Figure 2A:
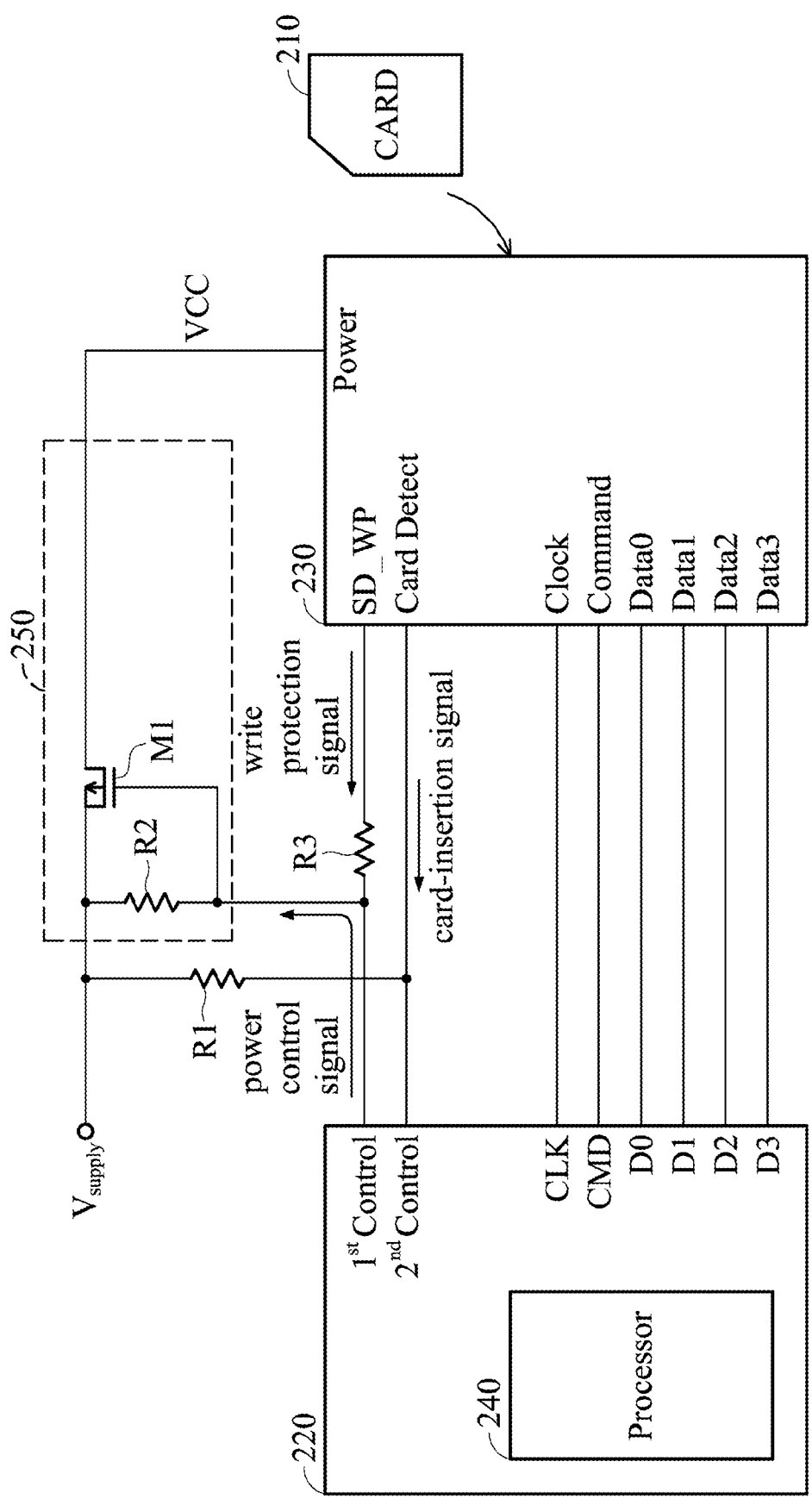
FIG. 2A shows a system for accessing a memory card according to an embodiment of the invention.

FIG. 2A shows a system 200 for accessing a memory card according to an embodiment of the invention. In the system 200, a memory card 210 is accessed by a control unit 220 via a socket 230, wherein the memory card 210 may be an SD, MS, MSP or MMC memory card. The control unit 220 comprises a processor 240 which is used to control the interactions between the memory card 210 and the control unit 220. The processor 240 may use eight pins to access and control the memory card 210. As shown in FIG. 2A, the CLK, CMD, D0, D1, D2 and D3 pins of the control unit 220 are coupled to the Clock, Command, Data0, Data1, Data2 and Data3 pins of the socket 230, respectively. Furthermore, a $2^{nd}$ Control pin is coupled to the Card Detect pin of the socket 230, and the processor 240 may sense a card-insertion signal indicating whether the memory card 210 has been inserted into the socket 230 via the $2^{nd}$ Control pin. A $1^{st}$ Control pin is coupled to a power unit 250 and coupled to the SD_WP pin of the socket 230 through a resistor R3. In addition, the $1^{st}$ Control pin is a multi-functional pin, and the processor 240 may configure the $1^{st}$ Control pin as an output pin to provide a power control signal to the power unit 250 and configure the $1^{st}$ Control pin as an input pin to sense a write protection signal indicating whether a write protection function of an SD memory card is enabled.

In the system 200, the power unit 250 comprises a transistor M1 which is controlled by the power control signal. When the transistor M1 is turned on by the power control signal, the power unit 250 may receive a supply power $V_{supply}$ and provide an operating voltage VCC to the inserted memory card 210 via the Power pin of the socket 230. Moreover, a pull-up resistor R1 is coupled between the $2^{nd}$ Control pin and the supply power $V_{supply}$, and a pull-up resistor R2 is coupled between the $1^{st}$ Control pin and the supply power $V_{supply}$. In this embodiment, the card-insertion signal sensed by the $2^{nd}$ Control pin is at a high voltage level when no memory card has been inserted into the socket 230; otherwise the card-insertion signal sensed by the $2^{nd}$ Control pin is at a low voltage level. The write protection signal sensed by the $1^{st}$ Control pin is at a high voltage level when the write protection function of an SD memory card is present; otherwise the write protection signal sensed by the $1^{st}$ Control pin is at a low voltage level.

Figure 2B:
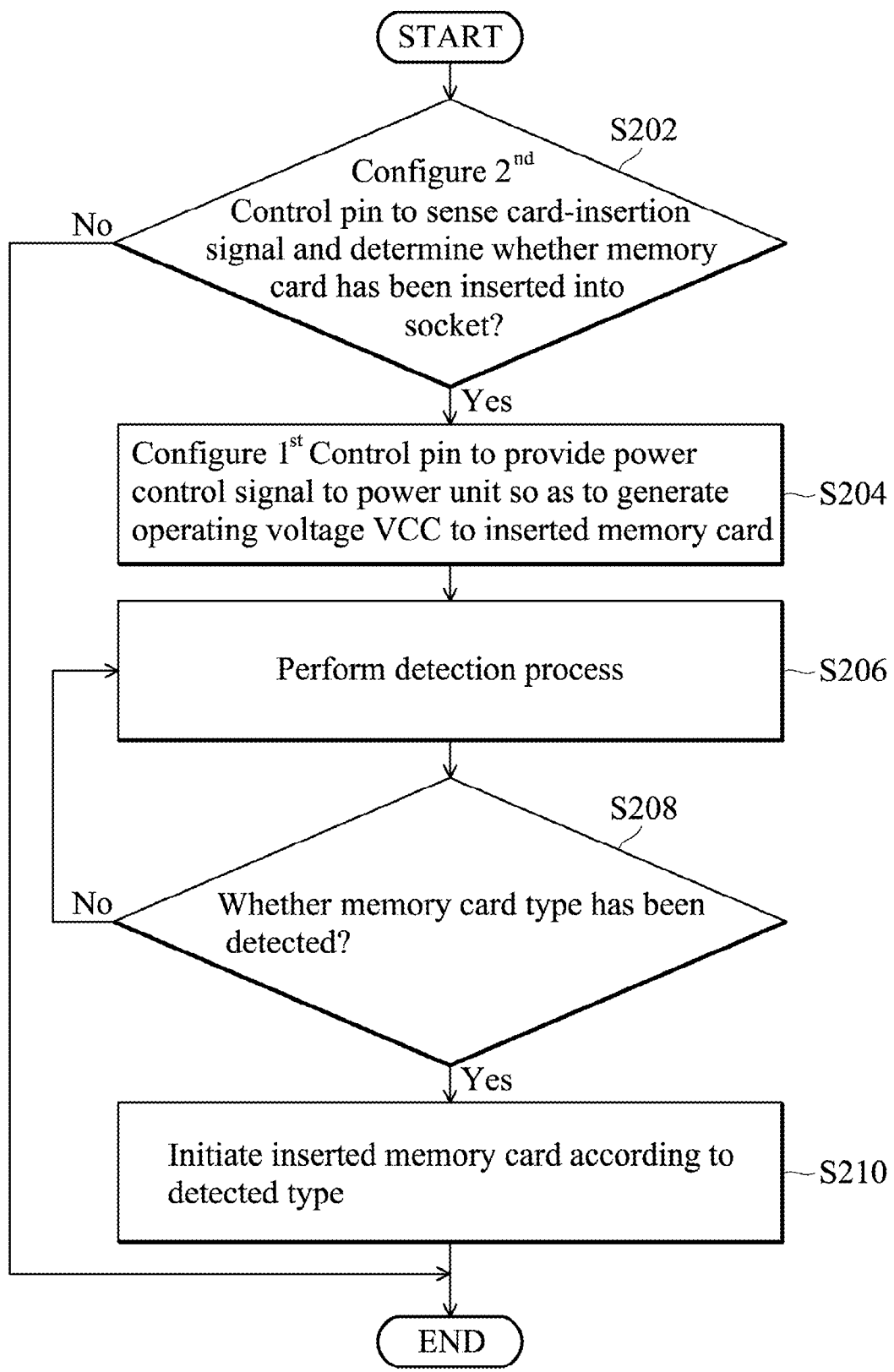
FIG. 2B shows a flow chart illustrating a method for accessing the memory card by the control unit in FIG. 2A.

FIG. 2B shows a flow chart illustrating a method for accessing the memory card 210 by the control unit 220, which is performed when executing software/firmware code by the processor 240 according to the embodiment shown in FIG. 2A. First, the processor 240 may configure the $2^{nd}$ Control pin to sense the card-insertion signal and determine whether the memory card 210 has been inserted into the socket 230 according to the sensed card-insertion signal (step S202). If the memory card has been inserted into the socket 230, the processor 240 may configure the $1^{st}$ Control pin to provide the power control signal to the power unit 250 so as to generate the operating voltage VCC to the inserted memory card 210 (step S204). Next, the processor 240 may perform a detection process repeatedly (step S206) until a type of the inserted memory card 210 has been detected (step S208). Next, the processor 240 may initiate the inserted memory card 210 according to the detected type (step S210) so that the processor 240 may subsequently access the inserted memory card 210.

Figure 2C:
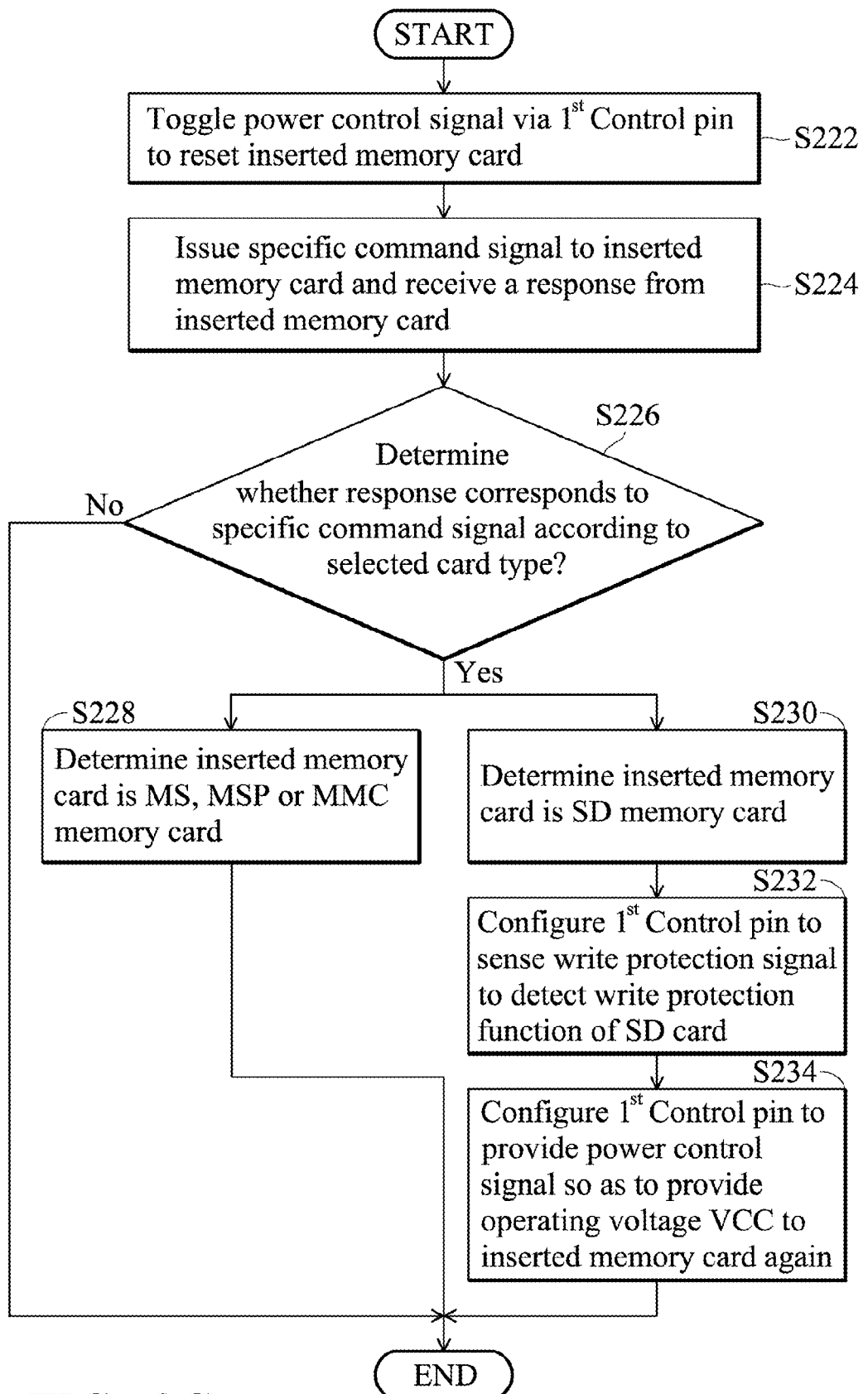
FIG. 2C shows a flow chart illustrating a method for performing the detection process described in FIG. 2B according to the embodiment shown in FIG. 2A.

FIG. 2C shows a flow chart illustrating a method for performing the detection process described in FIG. 2B according to the embodiment shown in FIG. 2A. First, the processor 240 may toggle the power control signal via the $1^{st}$ Control pin to reset the operating voltage VCC so as to reset the inserted memory card 210 (step S222). Next, the processor 240 may issue a specific command signal corresponding to a specific memory card type to the inserted memory card 210 and receive a response from the inserted memory card 210 (step S224), wherein the specific memory card type is selected from one of an MS, an MSP, an SD or an MMC memory card (i.e. the specific memory card type may be an MS, an MSP, an SD or an MMC memory card). Next, the processor 240 may check the response from the inserted memory card 210 to determine whether the response corresponds to the specific command signal according to the selected card type (step S226). If the response does not correspond to the specific command signal, the processor 240 may perform a next detection process and select another memory card type as a next specific memory card type; otherwise, the processor 240 may determine that the inserted memory card 210 is an MS, an MSP or an MMC memory card when the specific memory card type is an MS, an MSP or an MMC memory card (step S228) and determine that the inserted memory card 210 is an SD memory card when the specific memory card type is an SD memory card (step S230). After detecting that the inserted memory card 210 is an SD memory card in step S230, the processor 240 may configure the $1^{st}$ Control pin as an input pin to sense the write protection signal from the inserted memory card 210 and detect whether the write protection function of the inserted memory card 210 is present or not according to the sensed write protection signal (step S232). Next, the processor 240 may configure the $1^{st}$ Control pin as an output pin to provide the power control signal so as to again provide the operating voltage VCC to the inserted memory card 210 (step S234).

Figure 3A:
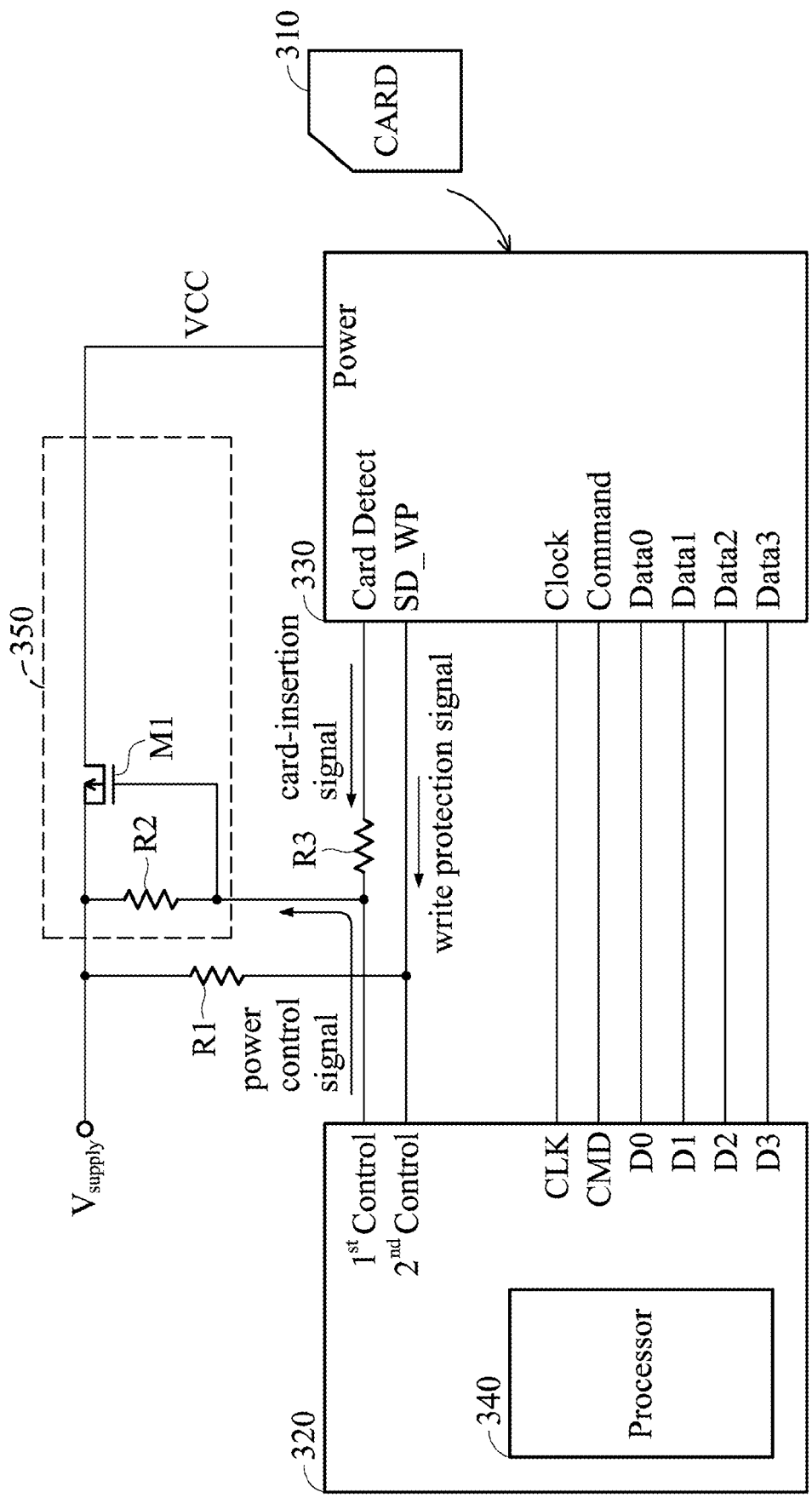
FIG. 3A shows a system for accessing a memory card according to another embodiment of the invention.

FIG. 3A shows a system 300 for accessing a memory card according to another embodiment of the invention. In the system 300, a memory card 310 is accessed by a control unit 320 via a socket 330, wherein the memory card 310 may be an SD, MS, MSP or MMC memory card. The control unit 320 comprises a processor 340 which is used to control the interactions between the memory card 310 and the control unit 320. The processor 340 may use eight pins to access and control the memory card 310. As shown in FIG. 3A, the CLK, CMD, D0, D1, D2 and D3 pins of the control unit 320 are coupled to the Clock, Command, Data0, Data1, Data2 and Data3 pins of the socket 330, respectively. Furthermore, a $1^{st}$ Control pin is coupled to the Card Detect pin of the socket 330 through a resistor R3 and also coupled to a power unit 350. In addition, the 1st Control pin is a multi-functional pin, and the processor 340 may configure the 1st Control pin as an output pin to provide a power control signal to the power unit 350 and configure the 1st Control pin as an input pin to sense a card-insertion signal indicating whether the memory card 310 has been inserted into the socket 330. A 2nd Control pin is coupled to the SD_WP pin of the socket 330, and the processor 340 may sense a write protection signal indicating whether a write protection function of an SD memory card is present via the 2nd Control pin. According to the power control signal, the power unit 350 may receive a supply power $V_{supply}$ and provide an operating voltage VCC to the inserted memory card 310 via the Power pin of the socket 330. Moreover, a pull-up resistor R1 is coupled between the 2nd Control pin and the supply power $V_{supply}$, and a pull-up resistor R2 is coupled between the 1st Control pin and the supply power $V_{supply}$. In this embodiment, the card-insertion signal sensed by the 1st Control pin is at a high voltage level when no memory card has been inserted into the socket 330; otherwise the card-insertion signal is at a low voltage level. The write protection signal sensed by the 2nd Control pin is at a high voltage level when the write protection function of an SD memory card is present; otherwise the write protection signal is at a low voltage level.

Figure 3B:
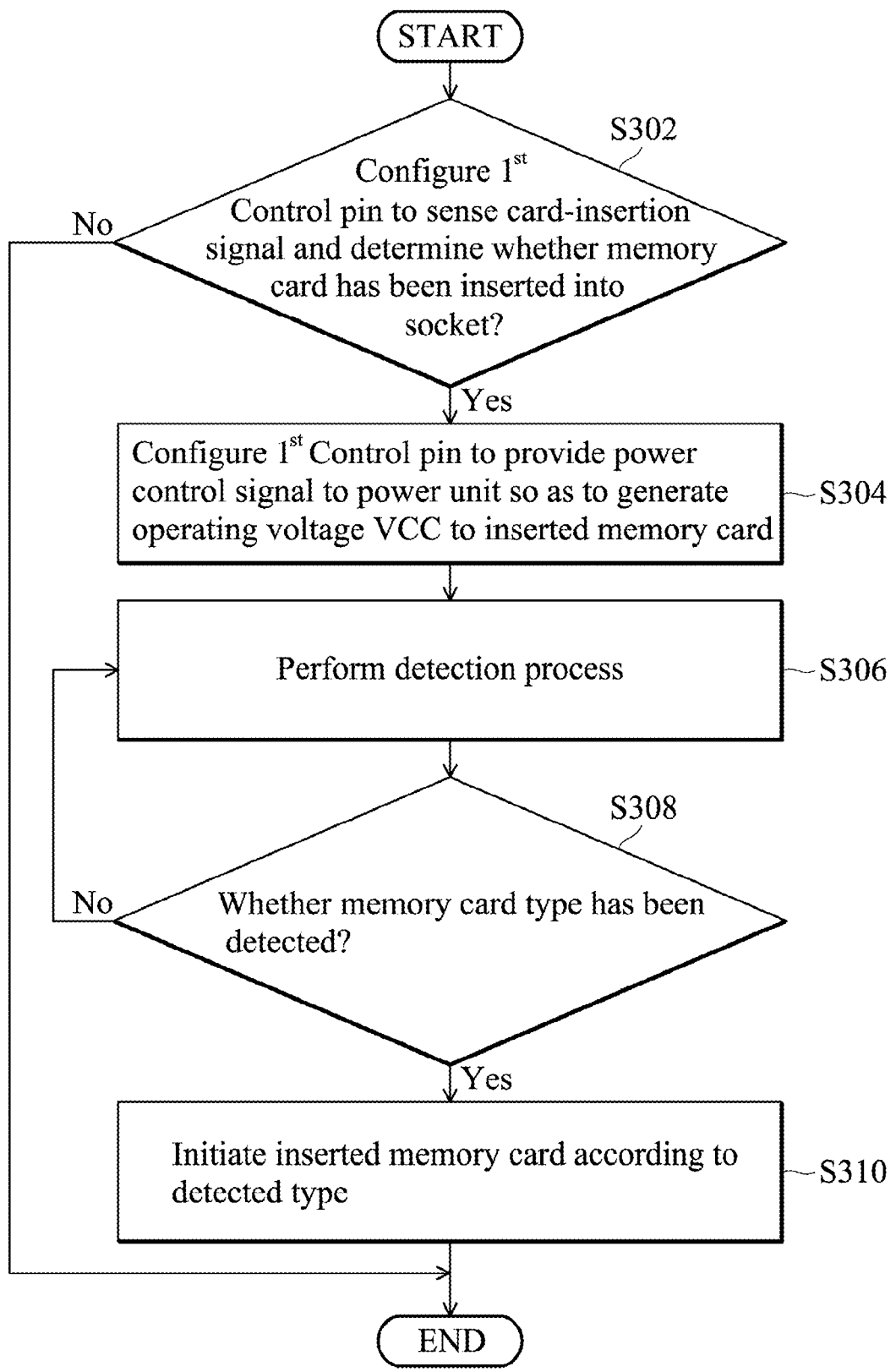
FIG. 3B shows a flow chart illustrating a method for accessing the memory card by the control unit in FIG. 3A.

FIG. 3B shows a flow chart illustrating a method for accessing the memory card 310 by the control unit 320, which is performed when executing software/firmware code by the processor 340 according to the embodiment shown in FIG. 3A. First, the processor 340 may configure the 1st Control pin as an input pin to sense the card-insertion signal and determine whether the memory card 310 has been inserted into the socket 330 according to the sensed card-insertion signal (step S302). If the memory card 310 has been inserted into the socket 330, the processor 340 may configure the 1st Control pin as an output pin to provide the power control signal to the power unit 350 so as to generate the operating voltage VCC to the inserted memory card 310 (step S304). Next, the processor 340 may perform a detection process repeatedly (step S306) until a type of the inserted memory card 310 has been detected (step S308). Next, the processor 340 may initiate the inserted memory card 310 according to the detected type of the inserted memory card 310 (step S310) so that the processor 340 may subsequently access the inserted memory card 310.

Figure 3C:
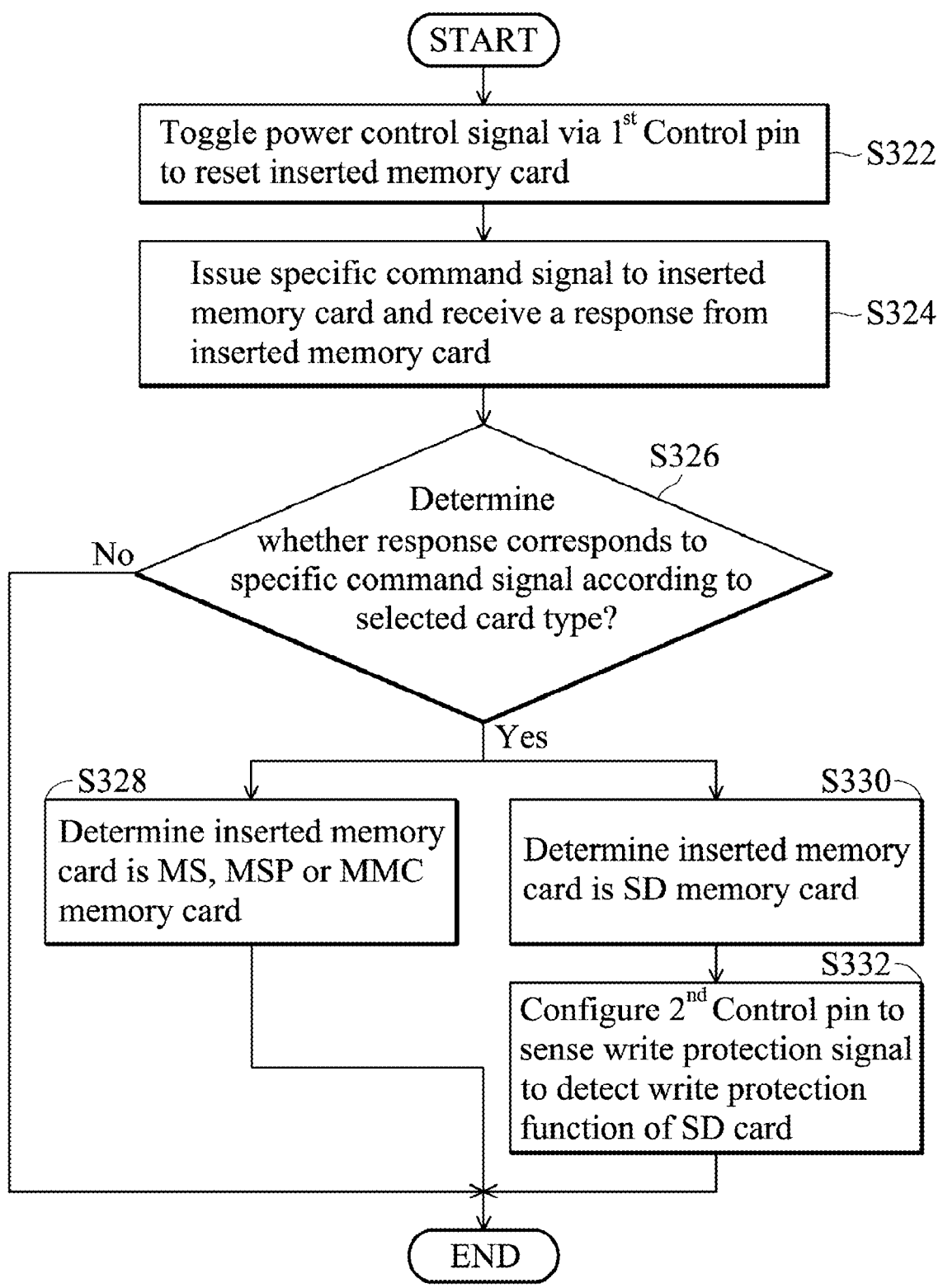
FIG. 3C shows a flow chart illustrating a method for performing the detection process described in FIG. 3B according to the embodiment shown in FIG. 3A.

FIG. 3C shows a flow chart illustrating a method for performing the detection process described in FIG. 3B according to the embodiment shown in FIG. 3A. First, the processor 340 may toggle the power control signal via the 1st Control pin to reset the operating voltage VCC so as to reset the inserted memory card 310 (step S322). Next, the processor 340 may issue a specific command signal corresponding to a specific memory card type to the inserted memory card 310 and receive a response from the inserted memory card 310 (step S324), wherein the specific memory card type is selected from one of an MS, an MSP, an SD or an MMC memory card. Next, the processor 340 may check the response to determine whether the response corresponds to the specific command signal according to the selected card type (step S326). If the response does not correspond to the command, the processor 340 may perform a next detection process and select another memory card type as a next specific memory card type; otherwise, the processor 340 may determine that the inserted memory card 310 is an MS, an MSP or an MMC memory card when the specific memory card type is an MS, an MSP or an MMC memory card (step S328) and determine that the inserted memory card 310 is an SD memory card when the specific memory card type is an SD memory card (step S330). After detecting that the inserted memory card 310 is an SD memory card, the processor 340 may configure the 2nd Control pin to sense the write protection signal from the inserted memory card 310 and detect whether the write protection function of the inserted memory card 310 is present or not according to the sensed write protection signal (step S332).

Figure 4A:
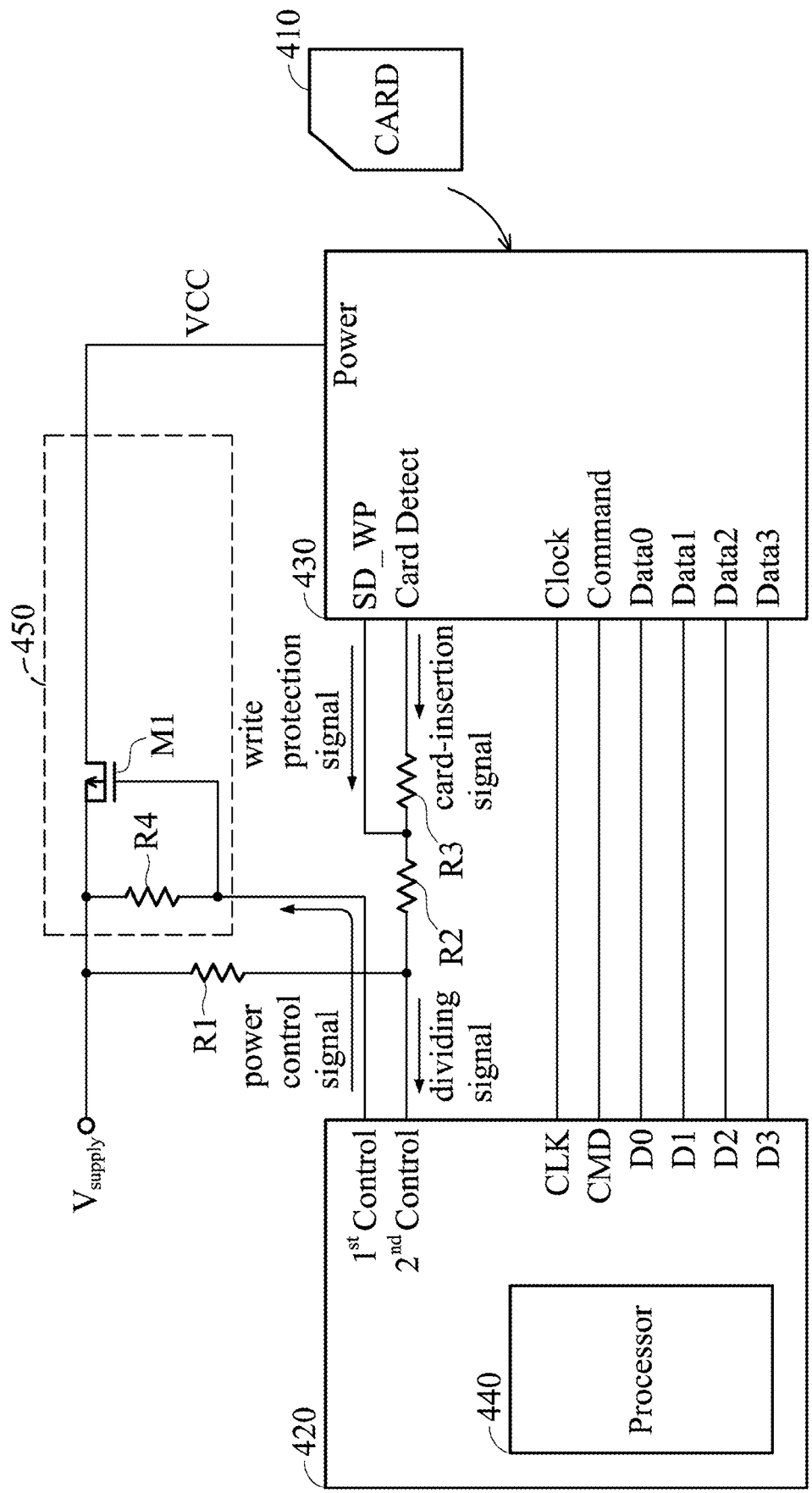
FIG. 4A shows a system for accessing a memory card according to another embodiment of the invention.

FIG. 4A shows a system 400 for accessing a memory card according to another embodiment of the invention. In the system 400, a memory card 410 is accessed by a control unit 420 via a socket 430, wherein the memory card 410 may be an SD, MS, MSP or MMC memory card. The control unit 420 comprises a processor 440 which is used to control the interactions between the memory card 410 and the control unit 420. The processor 440 may use eight pins to access and control the memory card 410. As shown in FIG. 4A, the CLK, CMD, D0, D1, D2 and D3 pins of the control unit 420 are coupled to the Clock, Command, Data0, Data1, Data2 and Data3 pins of the socket 430, respectively. Furthermore, a 1st Control pin is coupled to a power unit 450, and the processor 440 may provide a power control signal to the power unit 450 so as to provide an operating voltage VCC to the socket 430. In the system 400, the resistors R1, R2 and R3 may form a divider circuit. The resistor R1 is coupled between the a supply power $V_{supply}$ and a 2nd Control pin of the control unit 420, the resistor R2 is coupled between the 2nd Control pin and the SD_WP pin of the socket 430, and the resistor R3 is coupled between the SD_WP pin and the Card Detect pin of the socket 430.

In the system 400, the 2nd Control pin is a multi-functional pin, and the processor 440 may configure the 2nd Control pin to sense a write protection signal and a card-insertion signal from the socket 430 by receiving a dividing signal, wherein the write protection signal indicates whether a write protection function of the memory card 410 is present and the card-insertion signal indicates whether the memory card 410 has been inserted into the socket 430. As described above, the card-insertion signal is at a high voltage level when no memory card has been inserted into the socket 430; otherwise the card-insertion signal is at a low voltage level. The write protection signal is at a high voltage level when a write protection function of an SD memory card is present; otherwise the write protection signal is at a low voltage level. For example, a resistance proportion of the resistors R1, R2 and R3 may be 2:1:1. Therefore, the dividing signal received by the control unit 420 via the 2nd Control pin may have a voltage smaller than or equal to $V_{supply}/2$ when the memory card 410 has been inserted into the socket 430 (i.e. the card-insertion signal is at a low voltage level). Furthermore, the dividing signal may have a voltage substantially equal to $V_{supply}/2$ when an SD memory card is inserted into the socket 430 and the write protection function of the SD card is present. Otherwise, the dividing signal may have a voltage substantially equal to $V_{supply}/3$ when the SD card is inserted into the socket 430 and the write protection function of the SD card is absent.

Figure 4B:
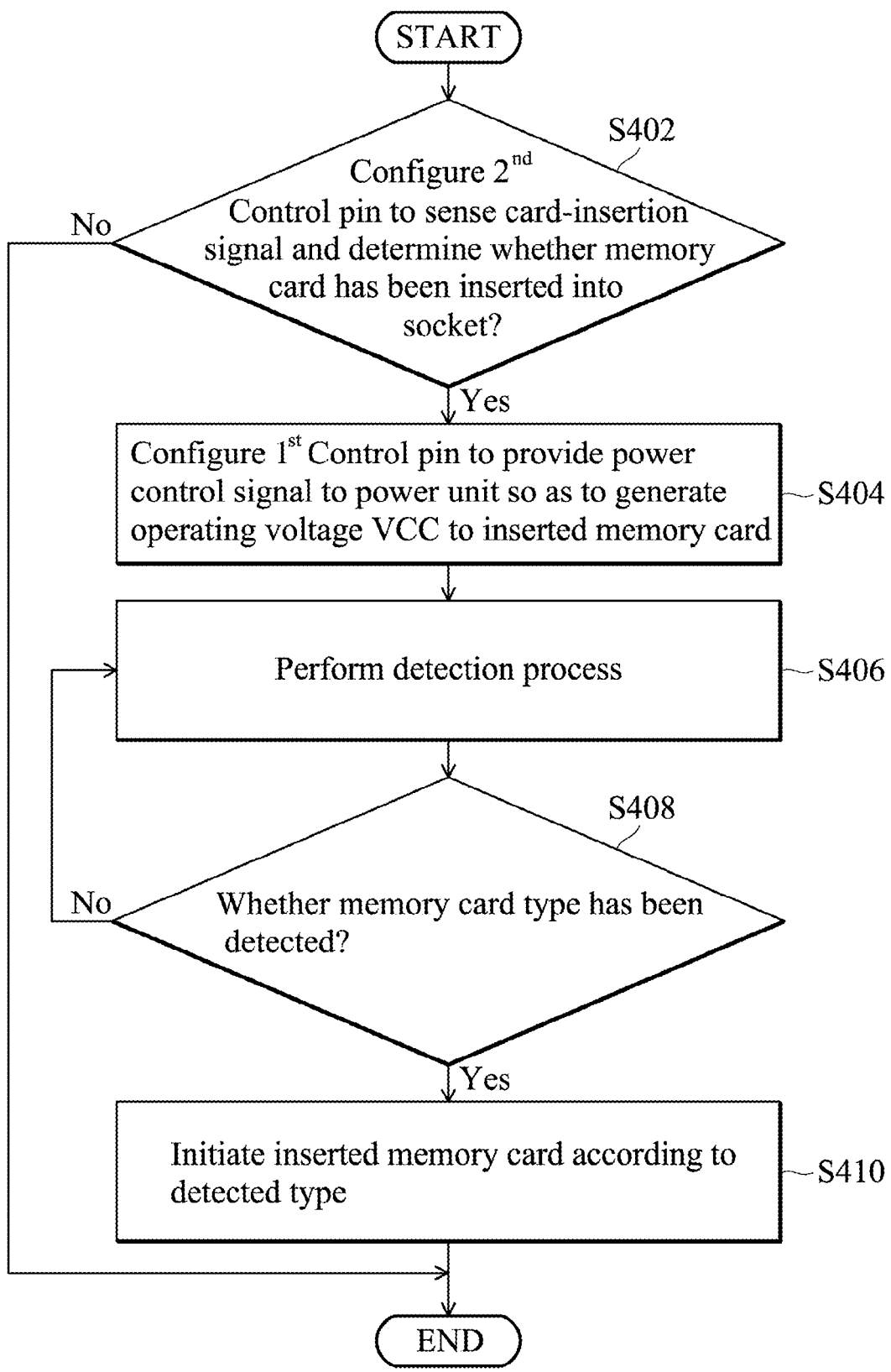
FIG. 4B shows a flow chart illustrating a method for accessing the memory card by the control unit in FIG. 4A.

FIG. 4B shows a flow chart illustrating a method for accessing the memory card 410 by the control unit 420, which is performed when executing software/firmware code by the processor 440 according to the embodiment shown in FIG. 4A. First, the processor 440 may configure the 2nd Control pin to sense the card-insertion signal by receiving the dividing signal and determine whether the memory card 410 has been inserted into the socket 430 according to the dividing signal (step S402), i.e. detect whether the dividing signal is smaller than or equal to a specific voltage which is related to the supply power $V_{supply}$ and the resistances of resistors R1-R3, as described above. If the memory card 410 has been inserted into the socket 430, the processor 440 may configure the 1$^{st}$ Control pin to provide the power control signal to the power unit 450 so as to generate the operating voltage VCC to the inserted memory card 410 (step S404). Next, the processor 440 may perform a detection process repeatedly (step S406) until a type of the inserted memory card 410 has been detected (step S408). Next, the processor 440 may initiate the inserted memory card 410 according to the detected type (step S410) so that the processor 440 may subsequently access the inserted memory card 410.

Figure 4C:
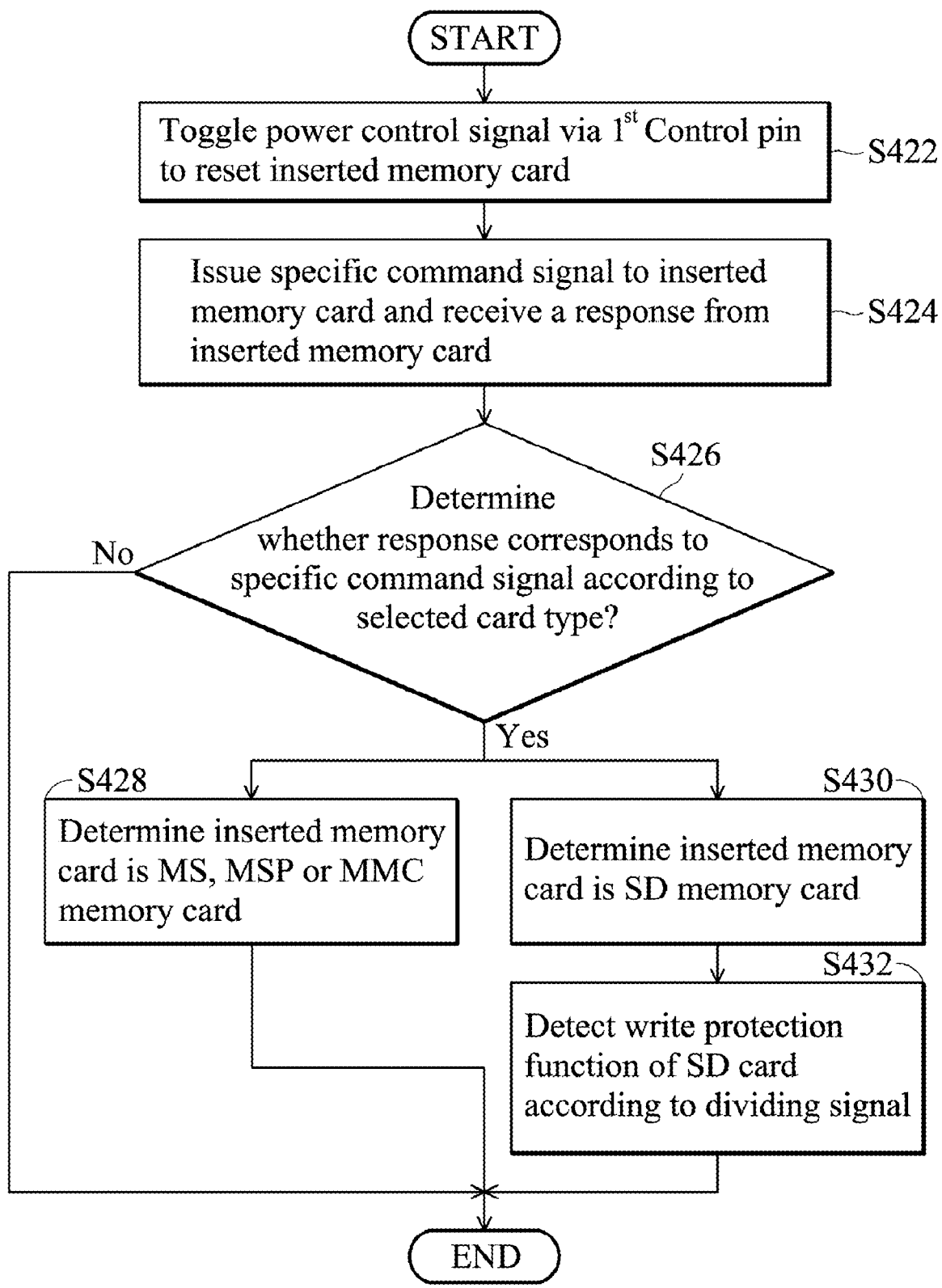
FIG. 4C shows a flow chart illustrating a method for performing the detection process described in FIG. 4B according to the embodiment shown in FIG. 4A.

FIG. 4C shows a flow chart illustrating a method for performing the detection process described in FIG. 4B according to the embodiment shown in FIG. 4A. First, the processor 440 may toggle the power control signal via the 1$^{st}$ Control pin to reset the operating voltage VCC so as to reset the inserted memory card 410 (step S422). Next, the processor 440 may issue a specific command signal corresponding to a specific memory card type to the inserted memory card 410 and receive a response from the inserted memory card 410 (step S424), wherein the specific memory card type is selected from one of an MS, an MSP, an SD or an MMC memory card. Next, the processor 440 may check the response to determine whether the response corresponds to the specific command signal according to the selected card type (step S426). If the response does not correspond to the command, the processor 440 may perform a next detection process and select another memory card type as a next specific memory card type; otherwise, the processor 440 may determine that the inserted memory card 410 is an MS, an MSP or an MMC memory card when the specific memory card type is an MS, an MSP or an MMC memory card and (step S428) and determine that the inserted memory card 410 is an SD memory card when the specific memory card type is an SD memory card (step S430). After detecting that the inserted memory card 410 is an SD memory card, the processor 440 may detect whether the write protection function of the inserted memory card 410 is present according to the previous received dividing signal via the 2$^{nd}$ Control pin (step S432). If the received dividing signal is substantially equal to a specific voltage, the processor 440 may determine that the write protection function of the SD card is present; otherwise, the write protection function is determined to be absent.

Figure 5A:
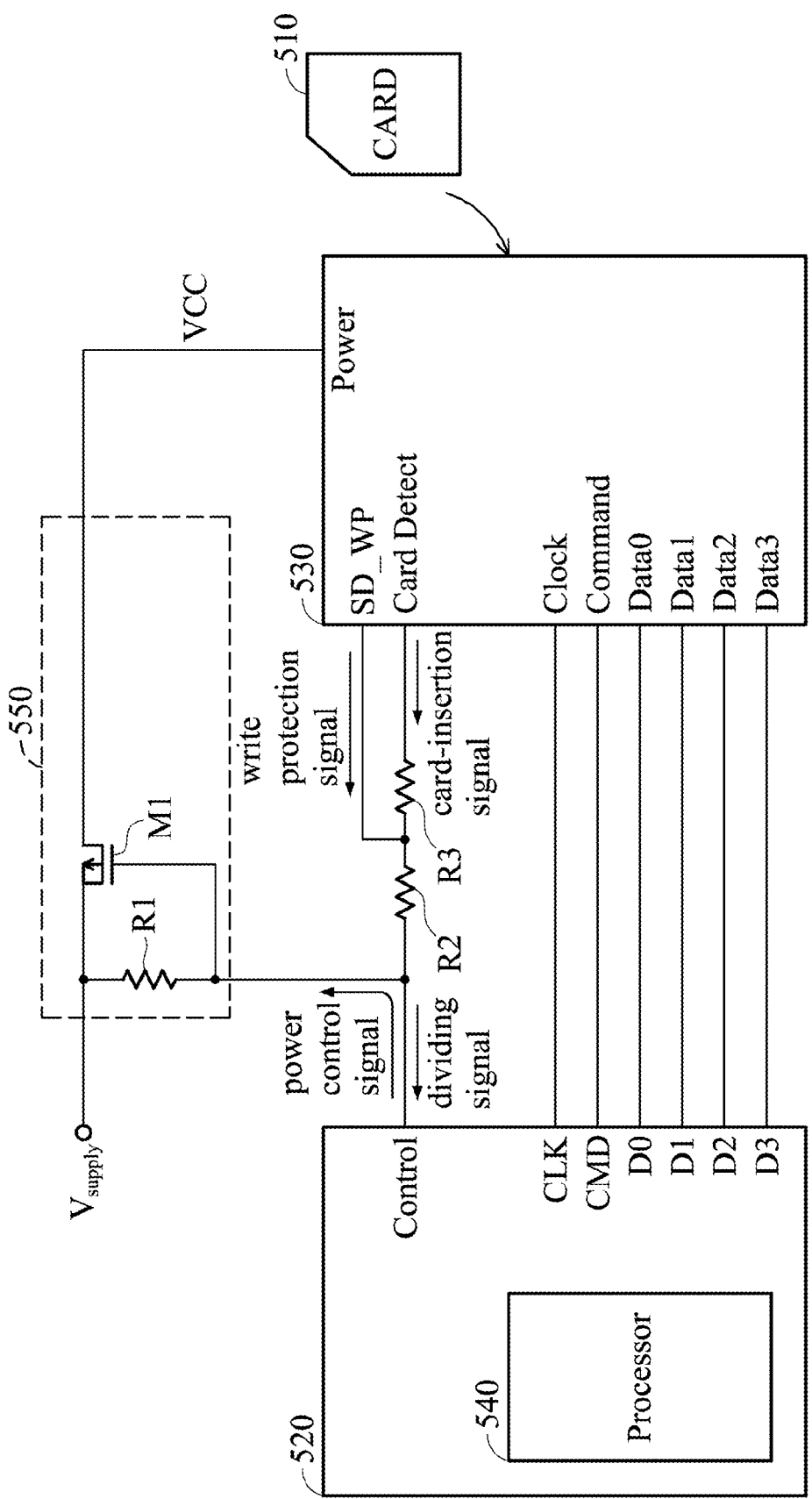
FIG. 5A shows a system for accessing a memory card according to another embodiment of the invention.

FIG. 5A shows a system 500 for accessing a memory card according to another embodiment of the invention. In the system 500, a memory card 510 is accessed by a control unit 520 via a socket 530, wherein the memory card 510 may be an SD, MS, MSP or MMC memory card. The control unit 520 comprises a processor 540 which is used to control the interactions between the memory card 510 and the control unit 520. The processor 540 may use seven pins to access and control the memory card 510. As shown in FIG. 5A, the CLK, CMD, D0, D1, D2 and D3 pins of the control unit 520 are coupled to the Clock, Command, Data0, Data1, Data2 and Data3 pins of the socket 530, respectively. Furthermore, a Control pin is coupled to a power unit 550, and the processor 540 may provide a power control signal to the power unit 550 so as to provide an operating voltage VCC to the inserted memory card 510 via the Power pin of the socket 530. In the system 500, resistors R1, R2 and R3 may form a divider circuit. The resistor R1 is coupled between the a supply power $V_{supply}$ and the Control pin of the control unit 520, the resistor R2 is coupled between the Control pin of the control unit 520 and the SD_WP pin of the socket 530, and the resistor R3 is coupled between the SD_WP pin and the Card Detect pin of the socket 530.

In the system 500, the Control pin is a multi-functional pin, and the processor 540 may configure the Control pin as an input pin to sense a write protection signal and a card-insertion signal from the socket 530, wherein the write protection signal indicates whether a write protection function of the memory card 510 is present and the card-insertion signal indicates whether the memory card 510 has been inserted into the socket 530. As described above, the card-insertion signal is at a high voltage level when no memory card has been inserted into the socket 530; otherwise the card-insertion signal is at a low voltage level. The write protection signal is at a high voltage level when a write protection function of an SD memory card is present; otherwise the write protection signal is at a low voltage level. A resistance proportion of the resistors R1, R2 and R3 may be selected as, for example, 2:1:1. Therefore, the dividing signal received by the control unit 520 via the Control pin may have a voltage smaller than or equal to $V_{supply}/2$ when the memory card 510 is inserted into the socket 530 (i.e. the card-insertion signal is at a low voltage level). Furthermore, the dividing signal may have a voltage substantially equal to $V_{supply}/2$ when an SD memory card is inserted into the socket 530 and the write protection function of the SD card is present. Otherwise, the dividing signal may have a voltage substantially equal to $V_{supply}/3$ when the SD card is inserted into the socket 530 and the write protection function of the SD card is absent.

Figure 5B:
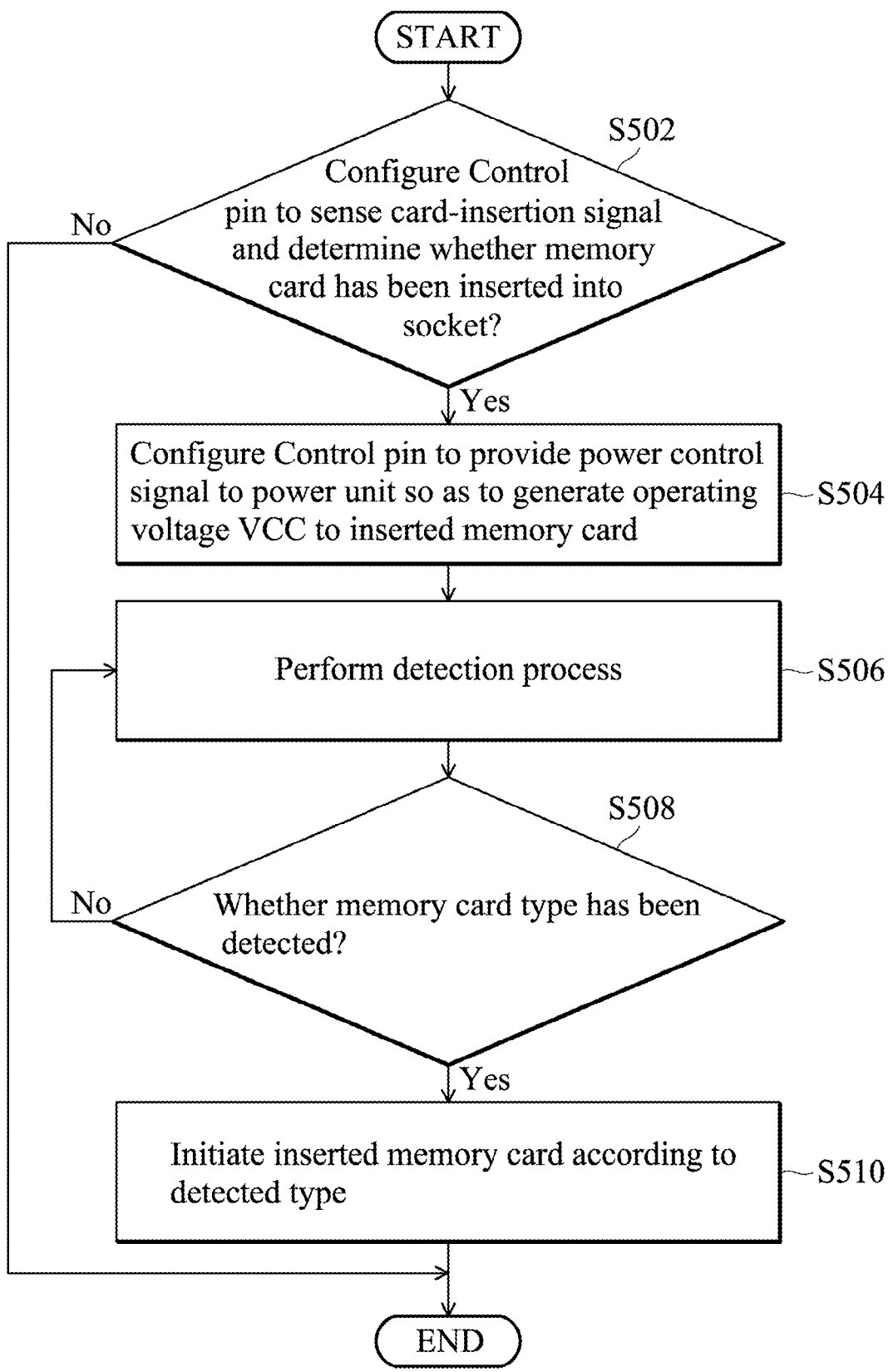
FIG. 5B shows a flow chart illustrating a method for accessing the memory card by the control unit in FIG. 5A.

FIG. 5B shows a flow chart illustrating a method for accessing the memory card 510 by the control unit 520, which is performed when executing software/firmware code by the processor 540 according to the embodiment shown in FIG. 5A. First, the processor 540 may configure the Control pin to sense the card-insertion signal by receiving the dividing signal and determine whether the memory card 510 has been inserted into the socket 530 according to the dividing signal (step S502), i.e. detect whether the dividing signal is smaller than or equal to a specific voltage which is related to the supply power $V_{supply}$ and the resistances of the resistors R1-R3, as described above. If the memory card has been inserted into the socket 530, the processor 540 may configure the Control pin as an output pin to provide the power control signal to the power unit 550 so as to generate the operating voltage VCC to the inserted memory card 510 (step S504). Next, the processor 540 may perform a detection process repeatedly (step S506) until a type of the inserted memory card 510 has been detected (step S508). Next, the processor 540 may initiate the inserted memory card 510 according to the detected type (step S510) so that the processor 540 may subsequently access the inserted memory card 510.

Figure 5C:
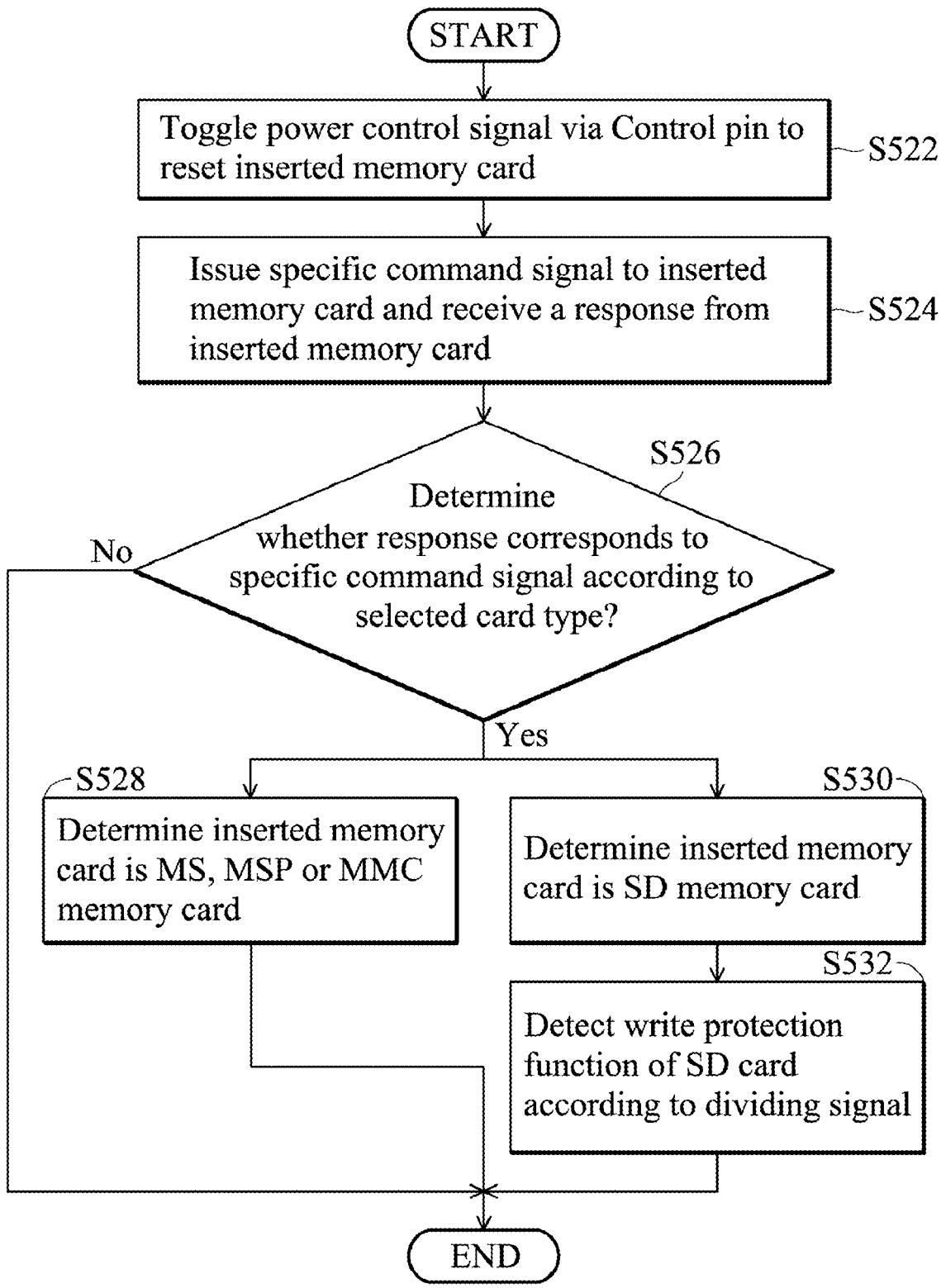
FIG. 5C shows a flow chart illustrating a method for performing the detection process described in FIG. 5B according to the embodiment shown in FIG. 5A.

FIG. 5C shows a flow chart illustrating a method for performing the detection process described in FIG. 5B according to the embodiment shown in FIG. 5A. First, the processor 540 may toggle the power control signal via the Control pin to reset the operating voltage VCC so as to reset the inserted memory card 510 (step S522). Next, the processor 540 may issue a specific command signal corresponding to a specific memory card type to the inserted memory card 410 and receive a response from the inserted memory card 510 (step S524), wherein the specific memory card type is selected from one of an MS, an MSP, an SD or an MMC memory card. Next, the processor 540 may check the response to determine whether the response corresponds to the specific command signal according to the selected card type (step S526). If the response does not correspond to the command, the processor 540 may perform a next detection process and select another memory card type as a next specific memory card type; otherwise, the processor 540 may determine that the inserted memory card 510 is an MS, an MSP or an MMC memory card when the specific memory card type is an MS, an MSP or an MMC memory card (step S528) and determine that the inserted memory card 510 is an SD memory card when the specific memory card type is an SD memory card (step S530). After detecting that the inserted memory card 510 is an SD memory card, the processor 540 may detect whether the write protection function of the inserted memory card 510 is present according to the previous received dividing signal (step S532). If the received dividing signal is substantially equal to the specific voltage, the processor 540 may determine that the write protection function of the SD card is present; otherwise, the write protection function is determined to be absent.

In one embodiment, the power unit described in the invention (e.g. 250 of FIG. 2A, 350 of FIG. 3A, 450 of FIG. 4A, or 550 of FIG. 5A) may be a low-dropout (LDO) linear regulator. Furthermore, the control unit described in the invention (e.g. 220 of FIG. 2A, 320 of FIG. 3A, 420 of FIG. 4A, or 520 of FIG. 5A) may be implemented in an integrated circuit (IC) thus using less pins to access a memory card and decreasing chip cost.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for accessing a memory card, comprising:
   a control unit comprising:
   a first control pin;
   a second control pin; and
   a processor configuring one of the first control pin and the second control pin to sense a card-insertion signal from a socket for indicating whether the memory card has been inserted into the socket, configuring one of the first control pin and the second control pin to provide a power control signal to supply an operating voltage to the memory card when the sensed card-insertion signal indicates that the memory card has been inserted into the socket, and configuring one of the first control pin and the second control pin to detect whether a write protection function of the memory card is present.

2. The system as claimed in claim 1, wherein the processor toggles the power control signal to reset the operating voltage when the memory card is inserted into the socket so as to reset the inserted memory card.

3. The system as claimed in claim 2, wherein the processor detects a type of the inserted memory card and initiates the inserted memory card when the type of the inserted memory card has been detected.

4. The system as claimed in claim 1, wherein the memory card is an SD memory card, an MS card, an MSP card or an MMC memory card.

5. The system as claimed in claim 4, wherein the processor detects whether the write protection function is present when the detected memory card is an SD memory card.

6. The system as claimed in claim 1, further comprising:
   a power unit providing the operating voltage to the memory card via the socket according to the power control signal.

7. The system as claimed in claim 6, wherein the processor configures the first control pin to provide the power control signal when the first control pin is coupled to the power unit, and the socket comprises:
   a first pin providing the card-insertion signal; and
   a second pin providing a write protection signal which indicates whether the write protection function of the memory card is present.

8. The system as claimed in claim 7, wherein the processor configures the first control pin to sense the write protection signal for detecting whether the write protection function of the memory card is present and configures the second control pin to sense the card-insertion signal when the first control pin is coupled to the second pin of the socket and the second control pin is coupled to the first pin of the socket.

9. The system as claimed in claim 7, wherein the processor configures the first control pin to sense the card-insertion signal and configures the second control pin to sense the write protection signal for detecting whether the write protection function of the memory card is present when the first control pin is coupled to the first pin of the socket and the second control pin is coupled to the second pin of the socket.

10. The system as claimed in claim 7, further comprising:
    a first resistor coupled between the supply power and the second control pin;
    a second resistor coupled between the second control pin and the second pin; and
    a third resistor coupled between the second pin and the first pin,
    wherein the processor configures the second control pin to sense the card-insertion signal and sense the write protection signal for detecting whether the write protection function of the memory card is present.

11. A method for accessing a memory card by a control unit with a first control pin and a second control pin, comprising:
    sensing a card-insertion signal via one of the first control pin and the second control pin, wherein the card-insertion signal indicates that the memory card has been inserted into a socket coupled to the control unit;
    providing a power control signal to a power unit via one of the first control pin and the second control pin, wherein the power unit provides an operating voltage to the inserted memory card; and
    detecting whether a write protection function of the inserted memory card is present via one of the first control pin and the second control pin.

12. The method as claimed in claim 11, further comprising:
    performing a detection process to detect a type of the inserted memory card; and
    initiating the memory card according the detected type of the memory card.

13. The method as claimed in claim 12, wherein the step of performing the detection process comprises:
    toggling the power control signal to reset the operating voltage;
    issuing a command corresponding to a specific memory card type to the inserted memory card and receiving a response therefrom; and
    determining that the type of the inserted memory card has been detected when the response corresponds to the command.

14. The method as claimed in claim 13, wherein the specific memory card type is one of an SD memory card, an MS card, an MSP card and an MMC memory card.

15. The method as claimed in claim 14, wherein the write protection function is detected when the inserted memory card is an SD memory card.

* * * * *